United States Patent [19]

Elfes et al.

[11] 4,192,750

[45] Mar. 11, 1980

[54] STACKABLE FILTER HEAD UNIT

[75] Inventors: Lee E. Elfes, Bloomfield Hills; Dale A. Wood, Canton, both of Mich.

[73] Assignee: Massey-Ferguson Inc., Detroit, Mich.

[21] Appl. No.: 921,424

[22] Filed: Jul. 3, 1978

Related U.S. Application Data

[63] Continuation of Ser. No. 712,986, Aug. 9, 1976, abandoned.

[51] Int. Cl.² .................. B01D 27/10; B01D 35/14
[52] U.S. Cl. ...................... 210/133; 210/232; 210/253; 210/254; 210/323 T; 210/335; 210/340; 210/341; 210/352; 210/422; 210/435; 210/443

[58] Field of Search ............... 210/232, 234, 252, 253, 210/322, 254, 323 R, 323 T, 335, 336, 339, 340, 341, 435, 436, 443, 444, 120, 422, 133, 314, 352, 498, 509, 417, 134; 137/315, 549, 544–547, 550; 29/527.5, 527.6, 557, 558; 251/118; 55/312–314

[56] References Cited

FOREIGN PATENT DOCUMENTS 1151969 5/1969 United Kingdom.

Primary Examiner—Frank Sever
Attorney, Agent, or Firm—John C. Thompson

[57] ABSTRACT

A filter assembly utilizing a plurality of stackable filter head units which permit parallel flow through filter elements mounted within filter bowls, there being one filter element and filter bowl mounted on each of the stackable filter head units. An improved filter head construction is employed which permits a plurality of substantially identical filter head units to be mounted adjacent each other to provide the desired flow capacity, each of the filter head units being so designed that it can be readily manufactured.

2 Claims, 5 Drawing Figures

STACKABLE FILTER HEAD UNIT

The present application is a continuation of U.S. application Ser. No. 712,986 filed Aug. 9, 1976, now abandoned.

The present invention relates generally to a filter design, and more particularly to an improved modular construction wherein a plurality of substantially identical filter head units may be interconnected adjacent to each other to provide parallel flow through filter elements mounted within filter bowls, there being one filter element and one filter bowl secured to each of the filter head units.

It has been recognized in the prior art that it may be desirable when filtering oil or a hydraulic fluid to employ a plurality of filtering elements. In one prior art design a plurality of filter head units may be stacked adjacent each other, the filter head units permitting series flow through filter elements carried by the units. It has been recognized that parallel flow through filtering elements may be more desirable than series flow through such elements. Various proposals have been made in the prior art for providing for parallel flow through a plurality of elements, but none of these prior art proposals have gained wide spread commercial acceptance. One design permits parallel flow through a pair of filter elements, but it is not possible to stack the filter head units to which the elements are connected in such a manner that three or more filtering elements can be utilized. Other prior art discloses a modular construction wherein two or more filter elements may be connected to two or more filter head units, but this construction has not gained wide spread commercial acceptance due to the difficulties in manufacturing the individual filter head units.

Therefore, it is an object of the present invention to provide a novel filter head unit to which a filter element and filter bowl may be secured, the filter head unit being so constructed that it can be readily secured to other like filter head units to provide for parallel flow through two or more filering elements, the filter head units being so designed that they can be readily manufactured and assembled adjacent to each other.

The foregoing object and other objects and advantages of the present invention are accomplished by providing a filter head unit including a member having first and second opposed generally planar end surfaces interconnectable with corresponding surfaces of like filter head units to permit stacking of the filter head units, a side surface adapted to receive one end each of a filter element and a filter bowl in generally concentric fluid type relationships, generally parallel inlet and outlet passageways which lie in a plane generally parallel to the side surface, the inlet and outlet passageways extending between the first and second end surfaces, a first port extending between the outlet passageway and the side surface to place the outlet passageway in communication with a chamber within the filter element, and a second port extending between the inlet passageway and the side surface to place the inlet passageway in communication with a chamber surrounding the filter element. In addition, the filter head unit further includes a relief valve extending between the inlet and outlet passageways.

The foregoing structure will be described in greater detail with reference to the accompanying drawings in which a preferred form of this invention is illustrated.

Figure 1:
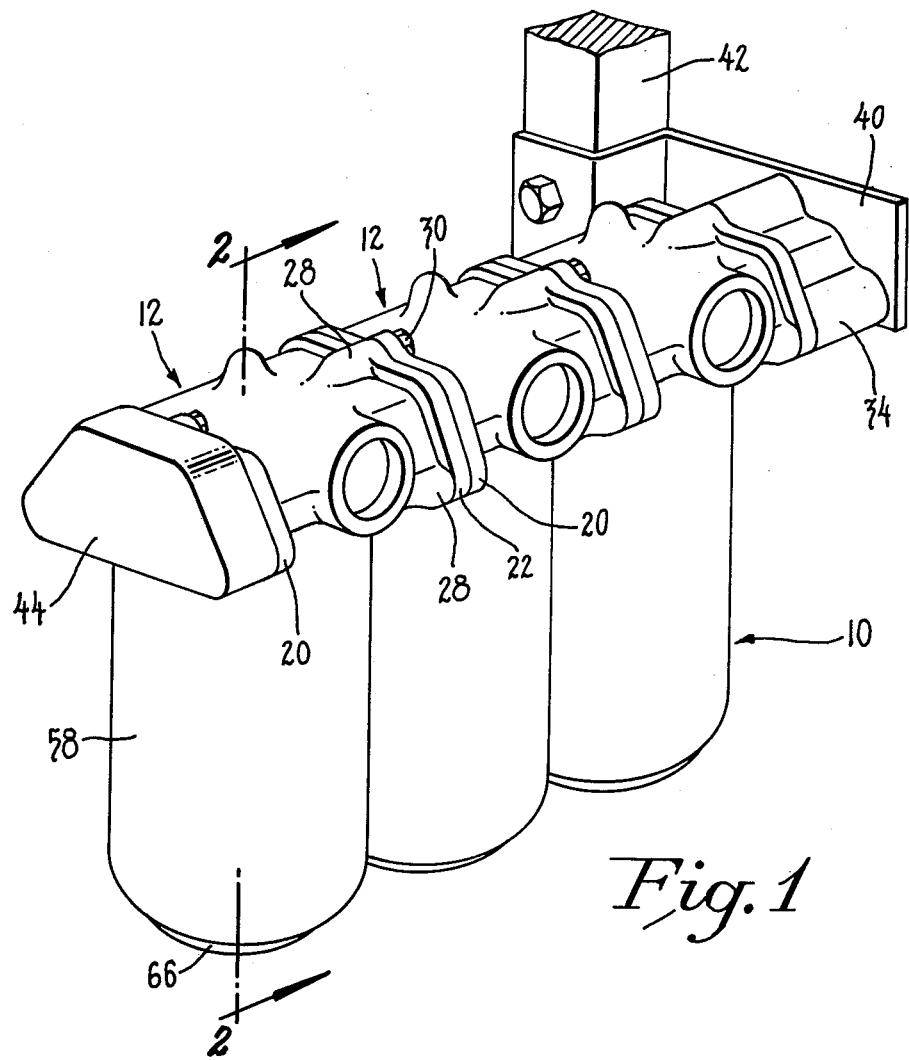
FIG. 1 is a perspective view showing three filter head units stacked adjacent each other, each of the filter head units carrying a filter bowl in which a filter element is mounted.
Figure 5:
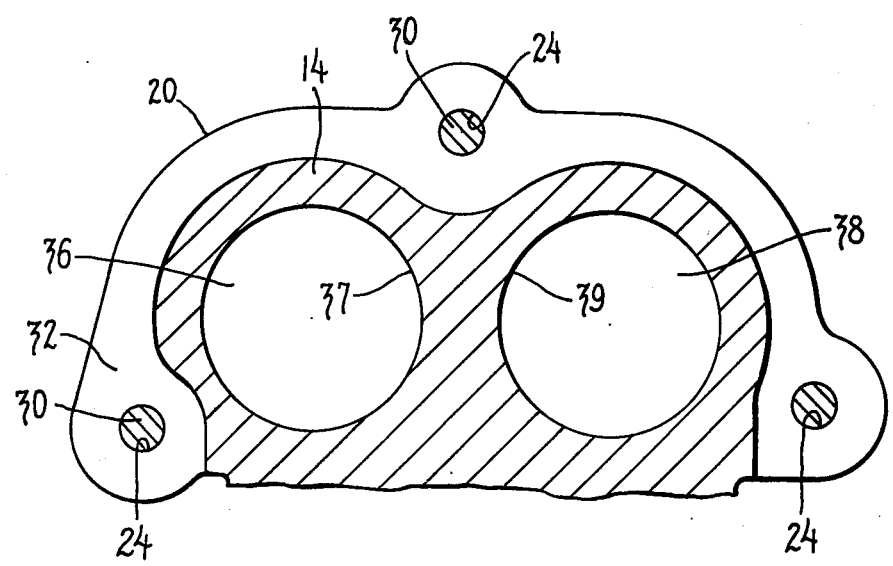
FIG. 5 is a section taken generally along the line 5—5 in FIG. 4.
Figure 3:
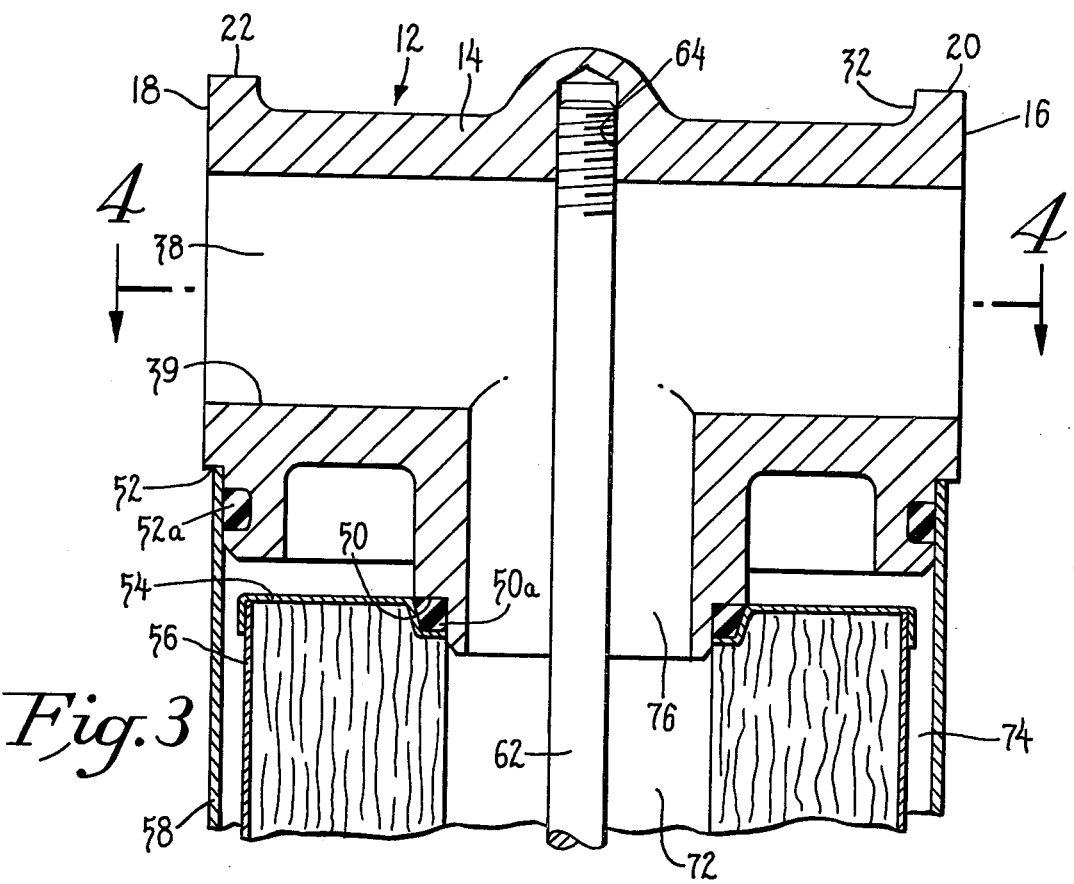
FIG. 3 is a section taken generally along the line 3—3 in FIG. 2.
Figure 4:
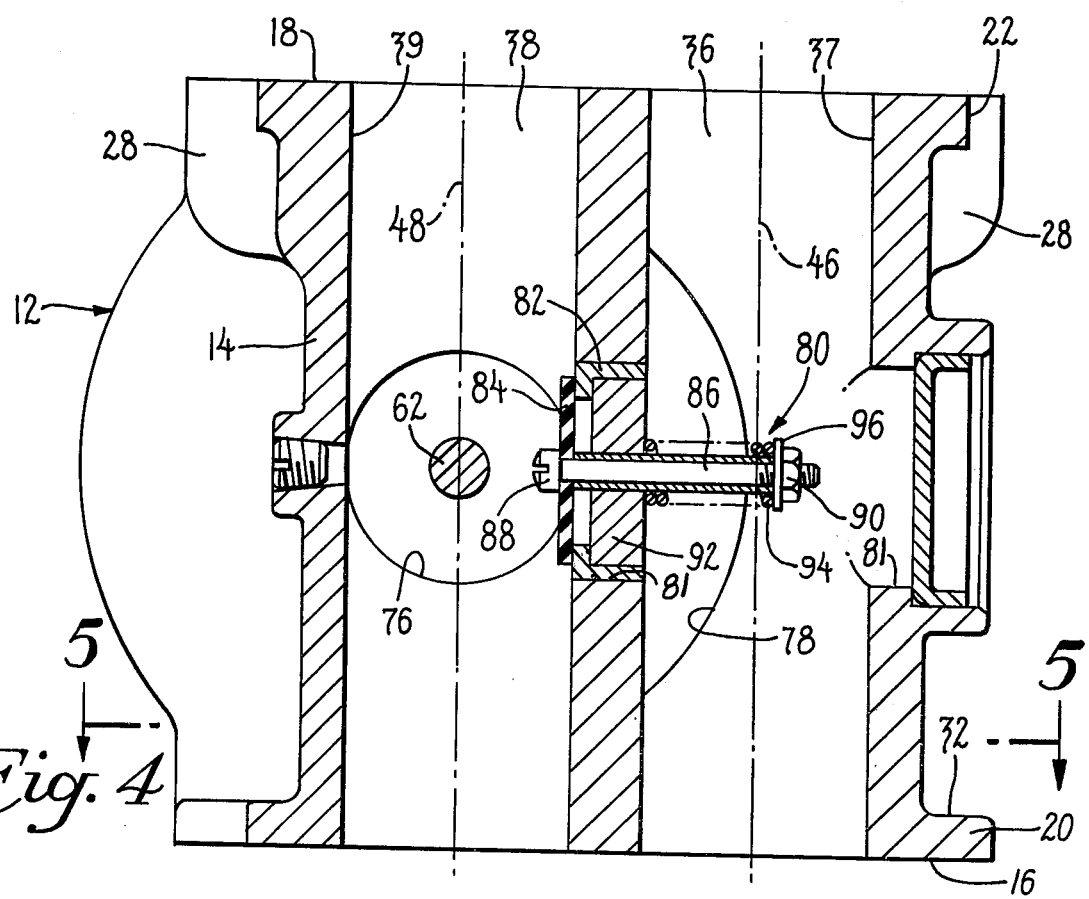
FIG. 4 is a section taken along line 4—4 in FIG. 3, the filter element and bowl being eliminated for purposes of clarity.

Referring first to FIG. 1, a filter assembly is illustrated which includes three stackable filter head units which have been secured to each other to provide for parallel flow through three filter elements, the filter assembly being indicated generally at 10, and the filter head units each being indicated generally at 12. Each of the filter head units 12, as can best be seen from FIGS. 3 and 4, includes a member 14 having first and second opposed generally planar end surfaces 16, 18, respectively, the first and second end surfaces being formed on the exterior surface of first and second mounting flanges 20, 22, respectively. The first mounting flange 20 is provided with a plurality of apertures 24 (FIG. 5) which extend through the mounting flange, and the second mounting flange is provided with a corresponding plurality of threaded recesses 26 formed in bosses 28, corresponding apertures 24 and recesses 26 being in alignment with each other. Fastening means or bolts 30 pass through the apertures 24 and are screwed into the threaded recesses 26 to secure adjacent filter head units to each other, the head of each bolt bearing against the inner surface 32 of the flange 20. Suitable sealing means (not shown) may be disposed between adjacent surfaces 16, 18.

An array of filter head units which have been secured to each other are in turn secured to a special mounting member 34 which is provided with passageways which are in communication with the inlet and outlet passageways 36, 38, respectively, of the adjacent filter head unit. The special mounting member 34 is customarily disposed between the surface 18 of one of the end filter head units of an array and a mounting bracket 40. The bracket 40 is in turn secured in a suitable manner to appropriate framework 42 of a tractor or the like. The mounting bracket 40 is also provided with suitable apertures which permit the special mounting member 34 to be secured to appropriate inlet and outlet lines (not shown). In a typical installation the outlet line will extend to a hydraulic pump, and the inlet line will extend to return lines and the hydraulic reservoir. The surface 16 of the other of the end filter head units may receive a closure plate 44 which blocks the inlet and outlet passageways 36, 38.

Figure 2:
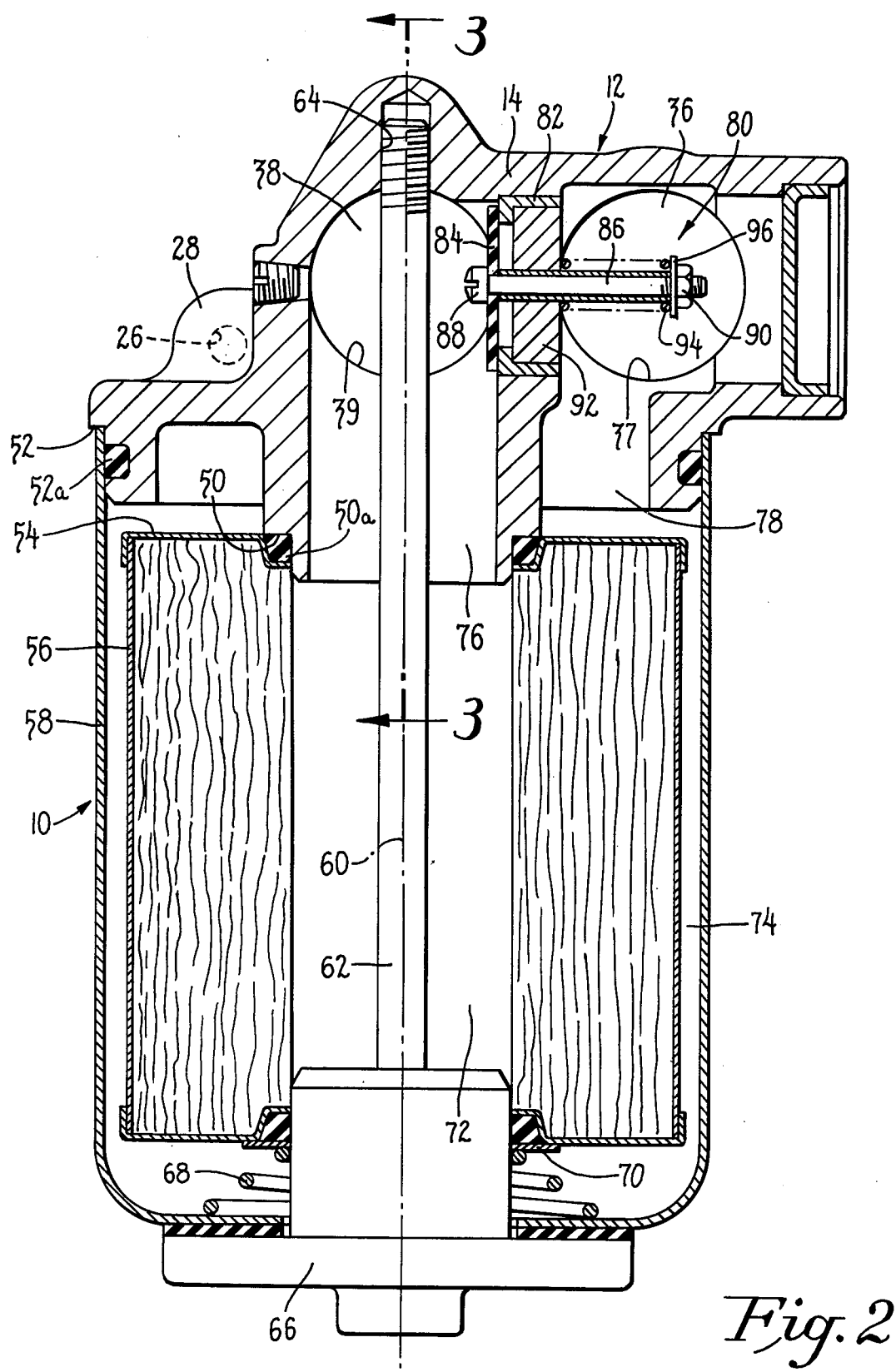
FIG. 2 is an enlarged sectional view of one of the filter head units shown in FIG. 2.

The inlet and outlet passageways 36, 38 of each of the filter head units 12 are formed in the member 14 and are generally parallel to each other and extend between the first and second end surfaces 16, 18. Each of the inlet and outlet passageways is defined by a generally cylindrical wall surface 37, 39, respectively, the cylindrical wall surfaces being generated about the center lines 46, 48 for the inlet and outlet passageways 36, 38, respectively. The wall surfaces and the center lines 46, 48 are disposed at right angles to the planar end surfaces 16, 18. The member 14 is provided with side surface means including inner and outer annular concentric mounting surfaces 50, 52, respectively. One end 54 of a conventional cylindrical filter element, indicated generally at 56, is customarily mounted in fluid type relationship to the inner annular surface 50, and the open end of a conventional cylindrical filter bowl 58 is mounted along the outer annular mounting surface 52. The filter bowl and filter element are mounted concentrically about each other and, when mounted, have a common center line 60. The filter element 56 and bowl 58 are secured to the filter head unit in a conventional manner. Thus, a rod 62 is provided, the rod being concentric with the center line 60, the upper end of the rod being threaded into a threaded bore 64 on the upper surface of the filter head unit. A retaining member 66 is pinned or otherwise rigidly secured to the lower end of the rod 62, a surface of the retaining member bearing against the lower surface of the bowl to force it into sealing relationship with the annular surface 52 and an O-ring 52a as the rod 62 is threaded into its secured position shown in FIG. 2. A spring 68 is disposed between the lower inner surface of the bowl 58 and bears against the lower face of a washer 70, the upper surface of which in turn bears against the lower surface of the filter to hold the upper end of the filter in a fluid tight relationship with the inner annular surface 50 and an O-ring 50a. As can best be seen from FIG. 2 the filter element 56 has spaced apart inner and outer cylindrical walls, the inner cylindrical wall defining a chamber 72. A second chamber 74 is defined by the outer surface of the filter element and the inner cylindrical wall surface of the filter bowl 58. As can best be seen from FIG. 2 a first port 76 extends between the outlet passageway 38 and the side surface means to place the outlet passageway 38 in communication with the first chamber 72. Similarly, a second port 78 is provided in the member 14 which extends between the inlet passageway 36 and the side surface means to place the inlet in communication with the second chamber 74. The first port has a generally cylindrical wall surface, the axis of which is also concentric with the center line 60.

A relief valve, indicated generally at 80, is disposed in a relief valve passageway 81 extending between the inlet and outlet passageways 36, 38 which passageway extends to one side of the member 14. The relief valve includes a valve seat 82, a valve plate 84 which is adapted to bear against the valve seat 82, a machine screw 86 the head 88 of which is adapted to bear against the plate 84, a nut 90 which is received on one end of the screw 86, a support member 92, the screw 86 passing through a central aperture in its support member 92, a spring 94 disposed between the support member and a washer 96 which is in turn disposed between the spring 94 and the nut 90. The support member 92 has additional apertures which are circumferentially spaced about the central aperture, these additional apertures permitting the flow of oil from the inlet passage to the outlet passage in the event that the filter elements 56 become clogged.

It is a feature of this invention that the filter heads are so designed that they can be easily manufactured, as for example, by a die casting process. In accordance with this feature it is necessary that the various portions of each of the members 14 be related to each other in such a manner that the member 14 can be easily die cast. In addition, various relationships must also be maintained so identical filter head units can be easily stacked adjacent each other. Thus, the said surface means, namely the inner and outer annular mounting surfaces 50, 52 must lie in planes which are perpendicular to the end surfaces 16 and 18 so that when the units are assembled adjacent to each other one filter bowl will not interfere with another filter bowl. In order to provide for ease of manufacture and facility of stacking adjacent units the passageways 36, 38 should also be disposed at right angles to the end surfaces 16, 18. In order to facilitate the die casting of the structure the passageways 36, 38 should lie in a plane parallel to the plane to the surfaces 50, 52. In addition, the center line 60 of the filter element should intersect the center line 48 of the outlet passageway 38. In accordance with these relationships the plane established by the center line 60, which is the center line for the filter element 56, the filter bowl 58, and the first port 76 and also the center line 48 for the outlet passageway 38 is at right angles to the plane established by the center lines 46 and 48 for the inlet and outlet passageways and is in addition at right angles to the planar end surfaces 16, 18. Similarly, the plane established by the center lines 46, 48 is also at right angles to the planar end surfaces 16, 18.

While a preferred structure in which the principles of the present invention have been incorporated is shown and described above, it is to be understood that the invention is not to be limited to the particular details, shown and described above, but that, in fact, widely differing means may be employed in the practice of the broader aspects of this invention.

What is claimed is:

1. A stackable filter head unit (12) of use with a filter element (56) having a cylindrical outer surface and a chamber (72) within the filter element, the chamber being concentric with the cylindrical outer surface, and a filter bowl (58) adapted to be disposed concentrically about the filter element (56) to define a second chamber therebetween; the filter head unit (12) including:

a member (14) having first and second opposed generally planar end surfaces (16, 18) interconnectable with corresponding surfaces of like filter head units to permit stacking of the filter head units, spaced apart generally parallel inlet and outlet passageways (36, 38) so dimensioned that die cast mold cores may be withdrawn therefrom, the passageways lying in a common first plane and extending between the first and second end surfaces and generally normal thereto, laterally offset annular side surfaces (50, 52) generally parallel to the first plane, the side surfaces being adapted to receive one end each of a filter element (56) and a filter bowl (58) in generally concentric fluid tight relationships, a first cylindrical port (76) so dimensioned that a die cast mold core may be withdrawn therefrom, the first port extending between the outlet passageway (38) and the center of the side surfaces (50, 52) and placing said outlet passageway in communication with the chamber (72) within the filter element (56), and a second port (78) so dimensioned that a die cast mold core may be withdrawn therefrom, the second port extending between the inlet passageway (36) and the side surfaces (50, 52) and placing the inlet passageway in communication with the chamber surrounding the filter element, the centerline of cylindrical port (76) being concentric with the centerline of the chamber (72) and defining a common second plane with the centerline of the outlet passageway, the passageways and ports being so oriented with respect to each other as to facilitate die casting of the member.

2. The stackable filter head unit set forth in claim 1 in which the filter head unit further includes a relief valve (80) extending between the inlet and outlet passageways (36, 38), the centerline of the relief valve lying in said common first plane, and the relief valve being disposed in a relief valve passageway (81) so dimensioned that a die cast mold core may be withdrawn therefrom.

* * * * *